United States Patent [19]

Gardner et al.

[11] Patent Number: 5,034,140
[45] Date of Patent: * Jul. 23, 1991

[54] WELL ACIDIZING COMPOSITIONS AND METHOD

[75] Inventors: Tommy R. Gardner; Walter R. Dill; William G. F. Ford; Karen L. King, all of Duncan, Okla.

[73] Assignee: Halliburton Company, Duncan, Okla.

[*] Notice: The portion of the term of this patent subsequent to Apr. 16, 2008 has been disclaimed.

[21] Appl. No.: 441,802

[22] Filed: Nov. 27, 1989

[51] Int. Cl.$^5$ .............................. E21B 43/27
[52] U.S. Cl. .................. 252/8.553; 252/8.551; 252/8.552; 252/8.554; 166/307; 166/308
[58] Field of Search ............... 252/8.551, 8.552, 8.53, 252/8.554; 166/307, 308, 309

[56] References Cited

U.S. PATENT DOCUMENTS

| | | | |
|---|---|---|---|
| 3,275,075 | 9/1966 | Gogarty et al. | 166/274 |
| 3,508,611 | 4/1970 | Davis et al. | 166/252 |
| 3,673,124 | 6/1972 | Holm | 252/8.554 |
| 3,754,599 | 8/1973 | Hummel et al. | 166/297 |
| 3,794,523 | 2/1974 | Thompson | 134/3 |
| 3,819,520 | 6/1974 | Jones et al. | 252/8.55 C |
| 3,831,679 | 8/1974 | Presley et al. | 166/307 |
| 3,875,452 | 3/1975 | Donham | 252/8.553 |
| 3,915,233 | 10/1975 | Slusser | 166/307 |
| 3,938,591 | 2/1976 | Ossie et al. | 166/275 |
| 3,970,148 | 7/1976 | Jones et al. | 166/307 |
| 4,012,329 | 9/1977 | Hayes et al. | 252/8.515 |
| 4,028,268 | 6/1977 | Sullivan, III et al. | 252/8.554 |
| 4,101,425 | 7/1978 | Young et al. | 252/8.553 |
| 4,146,499 | 3/1979 | Rosano | 252/8.554 |
| 4,207,193 | 6/1980 | Ford et al. | 252/8.552 |
| 4,342,657 | 8/1982 | Blair, Jr. | 252/8.554 |
| 4,414,120 | 11/1983 | Malloy et al. | 252/8.55 D |
| 4,536,301 | 8/1985 | Malloy et al. | 252/8.55 D |
| 4,570,656 | 2/1986 | Matlach et al. | 137/13 X |
| 4,595,512 | 6/1986 | Tellier et al. | 252/8.553 |
| 4,601,836 | 7/1986 | Jones | 252/8.553 |
| 4,686,053 | 8/1987 | Baviere et al. | 252/8.554 |
| 4,737,296 | 4/1988 | Watkins | 252/8.553 |
| 4,738,789 | 4/1988 | Jones | 252/8.553 |
| 4,823,874 | 4/1989 | Ford | 166/279 |
| 4,882,075 | 11/1989 | Jones | 252/8.553 |
| 4,886,609 | 12/1989 | Walton | 252/8.552 |
| 4,917,808 | 4/1990 | Balzer | 252/8.554 |
| 4,919,827 | 4/1990 | Harms | 252/8.553 |

OTHER PUBLICATIONS

An article by M. L. Hoefner and H. S. Fogler entitled "Effective Matrix Acidizing in Carbonates Using Microemulsions", *Chem. Eng. Prog.* pp. 40-44 (Apr. 1985).

An article by Mark L. Hoefner, H. Scott Fogler, Per Stenius and Johan Sjoblom entitled "Role of Acid Diffusion in Matrix Acidizing of Carbonates", *Journal of Petroleum Technology*, pp. 203-208 (Feb. 1987).

*Primary Examiner*—John S. Maples
*Assistant Examiner*—Chhaya Sayala
*Attorney, Agent, or Firm*—Thomas R. Weaver; Robert A. Kent; Clifford C. Dougherty, III

[57] ABSTRACT

A concentrate which forms an acid internal microemulsion well treatment composition when added to an acid treatment fluid. The concentrate comprises in the range of from about 20% to about 98% by weight of a hydrocarbon carrier fluid, in the range of from about 1% to about 50% by weight of an alkyl alcohol having from 4 to 18 carbon atoms and in the range of from about 1% to about 50% by weight of an emulsifying agent comprising at least one compound selected from the group consisting of sulfate esters, phosphate esters, alkyl aromatic sulfonic acids, amine salts having ester or amide linkages, quaternary ammonium compounds having ester of amide linkages, propoxylated fatty acids, and propoxylated alcohols. Also disclosed are an acid internal microemulsion well treatment composition and a method of treating a subterranean formation to increase the production of hydrocarbons therefrom.

38 Claims, No Drawings

WELL ACIDIZING COMPOSITIONS AND METHOD

BACKGROUND OF THE INVENTION

1. Field of the Invention.

The present invention relates to compositions and methods for treating oil and gas wells to stimulate the production of hydrocarbons therefrom.

2. Description of the Prior Art.

The use of acid to stimulate the production of hydrocarbons from damaged formations and formations having naturally low permeabilities is well known. Typically, the acid is pumped through the well into the formation where it dissolves the damaging material and/or reacts with the matrix and increases the size of pore spaces and channels therein.

When the flow of hydrocarbons is restricted only by formation damage, a large increase in productivity can usually be achieved by merely pumping the acid into the formation. Formation damage typically results from fines migration and/or plugging with substances such as drilling mud, water/oil emulsions and the like. Such damage is usually located in close vicinity to the wellbore. Once the damaging substances are removed, hydrocarbons from all over the formation can flow to the wellbore.

When the flow of hydrocarbons is restricted due to the naturally low permeability of the formation, however, a large increase in productivity is not as easily achieved. Upon entering formations having naturally low permeabilities such as formations consisting of limestone or sandstone, acid rapidly diffuses and begins reacting with the matrix. Delivery of the acid deeply and uniformly into the formation before it spends is often difficult or impossible. Inasmuch as the flow of hydrocarbons in formations having naturally low permeabilities is only increased in those areas to which unconsumed acid is delivered, any increase in productivity is proportional to the distance from the wellbore to which stimulation occurs.

Although the rate of acid spending can sometimes be reduced by increasing the viscosity of the acid fluid, the existence of an undesirable water zone above or below the formation being treated or other conditions making potential fracturing undesirable can prevent the use of an injection pressure sufficient to accommodate the increase in viscosity. Lowering the injection rate to lower the injection pressure negates the benefits of delayed spending that result from the increase in viscosity.

As a partial solution, various acid systems have been developed wherein the rate of acid diffusion and spending is decreased allowing unconsumed acid to be delivered to greater distances within the formation under normal injection rates and pressures. These retarded acid systems include micellar solutions, macroemulsions and microemulsions formed by the addition of various fluids, surface active agents and/or other special chemicals to the acid. Microemulsions are particularly effective due to their ability to restrict the mobility of the dispersed phase, their near zero interfacial tension and the size of the spherical droplets that form the same. They can rapidly penetrate into tight formations. The components forming microemulsions interact to provide a barrier to diffusion of the acid allowing unconsumed acid to be delivered deeply and uniformly into the formation.

Unfortunately, many of the microemulsions and other retarded acid systems developed heretofor are not effective in certain applications. Many of the systems undergo a phase change and separate when exposed to high temperatures or when diluted with water or brine. Some systems tend to form messy emulsions with crude oil which further plug the formation. Other systems are not capable of carrying a sufficient amount of acid into the formation to achieve the desired results.

By the present invention, improved well acidizing compositions and a method of treating a subterranean formation with the same are provided. The inventive compositions provide a low viscosity, retarded acid system that allows a large amount of unconsumed acid to be efficiently delivered deeply and uniformly into a formation. The effectiveness of the system is not diminished by the temperature of the formation, the formation of emulsions or incompatibility of the compositions with dilution water or brine.

Summary of the Invention

In one aspect, the present invention provides a concentrate which forms an acid internal microemulsion well treatment composition when added to an acid treatment fluid. The concentrate comprises in the range of from about 20% to about 98% by weight of a hydrocarbon carrier fluid, in the range of from about 1% to about 50% by weight of an alkyl alcohol having in the range of from 4 to 18 carbon atoms, and in the range of from about 1% to about 50% by weight of an emulsifying agent comprising at least one compound selected from the group consisting of sulfate esters, phosphate esters, alkyl aromatic sulfonic acids, amine salts (primary, secondary or tertiary) having ester or amide linkages, quaternary ammonium compounds having ester or amide linkages, propoxylated fatty acids and propoxylated alcohols. When the concentrate is combined with a well treatment fluid comprising straight acid or an aqueous acid solution, the acid or acid solution is microemulsified into the hydrocarbon carrier fluid.

In another aspect, the present invention provides an acid internal microemulsion well treatment composition. The composition comprises in the range of from about 20% to about 97% by weight of a hydrocarbon carrier fluid, in the range of from about 1% to about 50% by weight of an alkyl alcohol having in the range of from 4 to 18 carbon atoms, in the range of from about 1% to about 50% by weight of an emulsifying agent comprising at least one compound selected from the group consisting of sulfate esters, phosphate esters, alkyl aromatic sulfonic acids, amine salts (primary, secondary or tertiary) having ester or amide linkages, quaternary ammonium compounds having ester or amide linkages, propoxylated fatty acids and propoxylated alcohols, and in the range of from about 1% to about 50% by weight of an acid treatment fluid microemulsified into said hydrocarbon carrier fluid.

In yet another aspect, the present invention comprises a method of treating a subterranean formation to increase the production of hydrocarbons therefrom. The method comprises the step of contacting the formation with the acid internal microemulsion well treatment composition of the present invention.

The acid internal microemulsion well treatment composition of the present invention and acid internal microemulsion well treatment compositions formed by the addition of the concentrate of the present invention to an acid treatment fluid (the inventive compositions) are low viscosity, retarded acid solutions. The interfacial tensions of the inventive compositions are near zero, i.e., in the range of from about 2 to about 6 dynes per centimeter. The compositions do not separate into mutually insoluble phases and have the ability to rapidly carry a large amount of acid uniformly and deeply into a formation. The components of the compositions provide a barrier which decreases the diffusion and spending of the acid. The inventive compositions are thermodynamically stable, insensitive to dilution water or brine and do not form messy emulsions upon contact with crude oil.

It is, therefore, a principal object of the present invention to provide an improved low viscosity, retarded acid system.

Numerous other objects, features and advantages of the present invention will be readily apparent to those skilled in the art upon a reading of the following disclosure including the examples provided therewith.

DESCRIPTION OF THE PREFERRED EMBODIMENTS

The present invention provides a concentrate which forms an acid internal microemulsion well treatment composition when added to an acid treatment fluid, an acid internal microemulsion well treatment composition and a method of treating a subterranean formation to increase the production of hydrocarbons therefrom. The inventive acid internal microemulsion well treatment composition comprises the components of the inventive concentrate combined with an acid treatment fluid. The inventive method comprises the step of contacting the formation with the inventive acid internal microemulsion well treatment composition.

The concentrate of the present invention comprises in the range of from about 20% to about 98% by weight of a hydrocarbon carrier fluid, in the range of from about 1% to about 50% by weight of an alkyl alcohol having in the range of from 4 to 18 carbon atoms, and in the range of from 1% to about 50% by weight of an emulsifying agent comprising at least one compound selected from the group consisting of sulfate esters, phosphate esters, alkyl aromatic sulfonic acids, amine salts (primary, secondary or tertiary) having ester or amide linkages, quaternary ammonium compounds having ester or amide linkages, propoxylated fatty acids and propoxylated alcohols. Prior to being added to an acid treatment fluid, the concentrate is in the form of a concentrated liquid. When combined with an acid treatment fluid, the concentrate forms an acid internal microemulsion with the acid treatment fluid microemulsified into the hydrocarbon carrier fluid. The acid treatment fluid can comprise an aqueous acid solution or straight acid.

The hydrocarbon carrier fluid can be any aliphatic and/or aromatic hydrocarbon solvent. It forms the external phase of the well treatment composition and functions to carry the acid. Preferably, the hydrocarbon carrier fluid is selected from the group consisting of kerosene, diesel oil, xylene and mixtures of technical grade aromatic solvents such as technical grade xylene, benzene and toluene. Most preferably, the hydrocarbon carrier fluid is kerosene. The hydrocarbon carrier fluid is preferably present in the concentrate in an amount in the range of from about 20% to about 40%, most preferably in an amount of about 30%, by weight of the concentrate.

The alkyl alcohol is at least substantially dissolved in the hydrocarbon carrier fluid. When the concentrate is combined with the acid treatment fluid, the alkyl alcohol functions to reduce the interfacial tension of the resulting composition to near zero, i.e., to a value typically in the range of from about 2 to about 6 dynes per centimeter, and facilitates formation of the acid into micro size spherical droplets. It can be any straight or branched chain alkyl alcohol having from 4 to 18 carbon atoms. Alkyl alcohols having less than 4 carbon atoms tend to be soluble in both the hydrocarbon carrier fluid and the acid treatment fluid and therefore function as a co-solvent. Alkyl alcohols having more than 18 carbon atoms tend to be insoluble in the hydrocarbon carrier fluid. Preferably, the alkyl alcohol has from 4 to 12 carbon atoms. Alkyl alcohols having from 4 to 12 carbon atoms are very soluble in the hydrocarbon carrier fluid. Although the particular alkyl alcohol employed will vary depending on the nature of the hydrocarbon carrier fluid, the alkyl alcohol most preferably has from 4 to 8 carbon atoms. The alkyl alcohol is preferably present in the concentrate in an amount in the range of from about 1% to about 20%, more preferably in the range of from about 1% to about 10%, by weight of the concentrate.

The function of the emulsifying agent is to form and maintain a stable microemulsion with the acid treatment fluid microemulsified into the hydrocarbon carrier fluid. The particular emulsifying agent or agents employed depend primarily on the volume, type and concentration of acid to be microemulsified. When the concentrate is combined with the acid treatment fluid, the emulsifying agent is preferably at least substantially dissolved in the hydrocarbon carrier fluid. Preferably, the emulsifying agent comprises at least one compound selected from the group consisting of propoxylated alcohols, oleophilic betaines and propoxylated sorbitans. Most preferably, the emulsifying agent comprises a propoxylated alcohol. As shown by the examples, acid internal microemulsions that employ propoxylated branched chain alcohols, potassium salts of mixed amine propionates, and/or secondary alcohols having 15 carbon atoms and propoxylated with 9 moles of propylene oxide achieve excellent results. The emulsifying agent is preferably employed in the concentrate in an amount in the range of from about 1% to about 40%, more preferably in the range of from about 20% to about 40%, by weight of the concentrate.

Preferably, the concentrate further comprises in the range of from about 1% to about 20% by weight of a cosolvent for increasing the amount of acid that can be microemulsified into the hydrocarbon carrier fluid. The cosolvent is preferably a primary alcohol such as methanol or isopropanol. Most preferably, the co-solvent is isopropanol. When the concentrate is combined with the acid treatment fluid, the co-solvent is preferably at least substantially dissolved in the hydrocarbon carrier fluid. The co-solvent is preferably present in the concentrate in a concentration in the range of from about 5% to about 20%, more preferably in the range of from about 5% to about 10%, by weight of the concentrate. The weight ratio of the hydrocarbon carrier fluid to the co-solvent is preferably about 20:1, more preferably about 5:1.

In addition, the concentrate preferably comprises in the range of from about 1% to about 20% by weight of a co-surfactant for increasing the amount of the alkyl alcohol that can be dissolved into the hydrocarbon carrier fluid. The co-surfactant is preferably selected from the group consisting of glycol ethers, ethoxylated alcohols and propoxylated alcohols. More preferably, the co-surfactant is selected from the group consisting of glycol ethers and ethoxylated alcohols. Most preferably, the co-surfactant is ethylene glycol monobutyl ether (EGMBE). When the concentrate is combined with the acid treatment fluid, the co-surfactant is preferably at least substantially dissolved in the hydrocarbon carrier fluid. The co-surfactant is preferably present in the concentrate in a concentration in the range of from about 5% to about 20%, more preferably in the range of from about 5% to about 10%, by weight of the concentrate. The weight ratio of the hydrocarbon carrier fluid to the co-surfactant is preferably about 20:1, more preferably about 5:1.

The relative amounts of the components forming the concentrate are very important. For example, if not enough or too much of the alkyl alcohol is employed, the microemulsion will not be thermodynamically stable and will possibly invert into a macroemulsion. If a proper balance of components is achieved, a very stable microemulsion is easily formed. The precise amounts of the components employed depends primarily on the volume, type and concentration of acid to be microemulsified.

The amount of the concentrate that should be combined with the acid treatment fluid to form an acid internal microemulsion well treatment composition depends on the volume, type and concentration of acid to be microemulsified as well as many other factors commonly known to those skilled in the art. Generally, the well treatment composition will contain in the range of from about 1% to about 40% by weight of the acid treatment fluid and in the range of from about 60% to about 99% by weight of the components forming the concentrate. More typically, the well treatment composition will comprise in the range of from about 20% to about 30% by weight of the acid treatment fluid and in the range of from about 70% to about 80% by weight of the components forming the concentrate. Generally, an interfacial tension in the range of from about 2 to about 6 dynes per centimeter is achieved when the weight ratio of the concentrate to the acid solution is about 4:1.

The acid internal microemulsion well treatment composition of the present invention comprises the components of the concentrate of the present invention combined with an acid treatment fluid. The acid treatment fluid is microemulsified into the hydrocarbon carrier fluid. The alkyl alcohol is at least substantially dissolved in the hydrocarbon carrier fluid. If the co-solvents and co-surfactants are employed, they are preferably also at least substantially dissolved in the hydrocarbon carrier fluid.

The acid treatment fluid can be straight acid or an aqueous acid solution. Suitable acids include hydrochloric acid, acetic acid, citric acid, erythorbic acid, formic acid, hydrofluoric acid and mixtures thereof. I fan acid solution is employed, the acid or acids are preferably present int he solution in concentrations ranging from 0.1 volume percent and up. Preferably, the acid treatment fluid is an aqueous hydrochloric acid solution comprising in the range of from about 1% to about 38% by weight hydrochloric acid.

Preferably, the acid internal microemulsion well treatment composition comprises in the range of from about 25% to about 60% by weight of the hydrocarbon carrier fluid, in the range of from about 1% to about 10% by weigh of the alkyl alcohol, in the range of from about 10% to about 40% by weight of the emulsifying agent and in the range of from about 1% to about 40% by weight of the acid treatment fluid. More preferably, the well treatment composition comprises in the range of from about 20% to about 30% by weight of the hydrocarbon carrier fluid, in the range of from about 1% to about 5% by weight of the alkyl alcohol, in the range of from about 10% to about 30% by weight of the emulsifying agent and in the range of from about 20% to about 30% by weight of the acid treatment fluid.

If the co-solvent is employed for increasing the amount of acid that can be microemulsified into the hydrocarbon carrier fluid, it is preferably present in the composition in a concentration in the range of from about 1% to about 20%, more preferably in the range of from about 5% to about 20%, by weight of the composition. Most preferably, if a co-solvent is employed for increasing the amount of acid that can be microemulsified into the hydrocarbon carrier fluid, it is present in the composition in a concentration in the range of from about 5% to about 10% by weight of the composition. Similarly, if a co-surfactant is employed for increasing the amount of the alkyl alcohol that can be dissolved int he hydrocarbon carrier fluid, it is preferably present in the composition in a concentration in the range of from about 1% to about 20%, more preferably in a range of from about 5% to about 20%, by weight of the composition. Most preferably, if a co-surfactant is employed for increasing the amount of alkyl alcohol that can be dissolved in the hydrocarbon fluid, it is present in the composition in a concentration in the range of from about 5% to about 10% by weigh of the composition.

Various additives such as emulsion preventers, antisludging additives and corrosion inhibitors can be effectively employed with both the concentrate and the well treatment composition of the present invention. The compositions are generally stable enough to accommodate such additives.

The method of the present invention comprises contacting the formation with the inventive acid internal microemulsion well treatment composition. The composition is introduced into the formation by way of the wellbore and preferably allowed to react with the formation until the acid is spent. The spent composition is preferably then recovered from the formation together with the material produced as a result of reaction of the composition therewith.

Thus, the acid internal microemulsion well treatment composition of the present invention and acid internal microemulsion well treatment compositions formed with the concentrate of the present invention provide low viscosity, retarded acidizing systems. The microemulsions retard diffusion and spending of the acid allowing a large amount of unconsumed acid to be rapidly delivered uniformly and deeply into the formation.

Microemulsions are stable dispersions of one liquid in another in the form of spherical droplets having diameters of less than about 0.14 microns. The micro size droplets allow light to pass through the emulsions causing them to appear transparent. The volume of acid that can be incorporated into the inventive compositions is greater than the volume of acid that can be incorporated into micellar, macroemulsion or other microemulsion solutions. The interfacial tensions achieved by the compositions are near zero.

The inventive compositions are stable from less than 0° F. to approximately 160° F. The compositions do not undergo a phase change or precipitate solids when diluted with fresh water or brine or when subjected to elevated temperatures. The compositions are compatible with and effectively sequester iron. They do not cause unacceptable corrosion or form emulsions with oil present in the formation.

The inventive compositions can be used in a number of applications. They are particularly suitable for use as retarded acid systems, i.e., systems that allow a large amount of unconsumed acid to be effectively delivered deeply and uniformly into a formation. Due to the fact that the inventive compositions have an interfacial tension of near zero, the pressure required to pump the compositions into the formation is low and recovery of the compositions is relatively easy.

In order to illustrate a clear understanding of the compositions and method of the present invention, the following examples are given. Although the examples are presented to illustrate certain specific embodiments of the invention, they are not to be construed to be restrictive of the scope and spirit thereof.

EXAMPLE I

Various samples of the inventive concentrate were tested to determine how much acid could be microemulsified into the hydrocarbon carrier fluid upon combination of the concentrate with the same.

All of the samples were formed by placing pre-weighed amounts of the emulsifying agent, alkyl alcohol and co-solvent if employed, into a one ounce bottle and adding a specific amount of the hydrocarbon carrier fluid thereto. Kerosene was employed as the hydrocarbon carrier fluid in each sample.

In each test, the acid was added to the sample drop wise until the sample remained cloudy. The weight percent of each component in the microemulsion was then calculated based on the initial weight of the component and the total weight of the microemulsion.

First, a batch of samples employing a propoxylated branched chain alcohol as the emulsifying agent and n-hexanol as the alkyl alcohol were formed. The propoxylated branched chain alcohol employed is sold by Berol Chemical Co. under the trade name "BEROL A-2 ®". In a first series of tests, the total amount of the emulsifying agent and alkyl alcohol was varied while maintaining a weight ratio of emulsifying agent to alkyl alcohol of 2:1. In a second series of tests, the weight ratio of emulsifying agent to alkyl alcohol was varied from 1:1 to 4:1. In both series of tests, the acid employed was an acid solution comprising 15% by weight hydrochloric acid. The results of the tests are shown in Tables I and II below.

TABLE I

| | Constant Emulsifying Agent/Alkyl Alcohol Ratio | | | | |
|---|---|---|---|---|---|
| Emulsifying Agent/Alkyl Alcohol Ratio | Emulsifying Agent/Alkyl Alcohol Amount (Wt. %) | Kerosene (Wt. %) | 15% HCl (Wt. %) | Total Wt. (Wt. %) | Emulsifying Agent & Alkyl Alcohol/HCl Ratio |
| 2:1 | 10.3 | 87.0 | 2.7 | 100 | 3.81 |
| 2:1 | 20.4 | 71.8 | 7.8 | 100 | 2.62 |
| 2:1 | 34.0 | 55.0 | 11.0 | 100 | 3.09 |
| 2:1 | 46.0 | 43.2 | 10.8 | 100 | 4.26 |
| 2:1 | 61.0 | 17.4 | 21.6 | 100 | 2.82 |

TABLE II

| | Varying Emulsifying Agent/Alkyl Alcohol Ratio | | | | |
|---|---|---|---|---|---|
| Emulsifying Agent/Alkyl Alcohol Ratio | Emulsifying Agent/Alkyl Alcohol Amount (Wt. %) | Kerosene (Wt. %) | 15% HCl (Wt. %) | Emulsifying Agent & Alkyl Alcohol/HCl Ratio | |
| 1:1 | 25.8 | 67.0 | 7.2 | 3.58 | |
| 2:1 | 34.0 | 55.0 | 11.0 | 3.09 | |
| 3:1 | 28.9 | 58.0 | 13.0 | 2.22 | |
| 4:1 | 29.0 | 58.0 | 13.0 | 2.23 | |

As shown by Table I, from 2.7 to 21.6 percent by weight of a solution comprising 15% by weight hydrochloric acid could be microemulsified into kerosene by employing a propoxylated branched chain alcohol ("BEROL A-2 ®") as the emulsifying agent and N-hexanol as the alkyl alcohol. As shown by Table II, the amount of acid that could be microemulsified into the system was not significantly effected by varying the ratio of the emulsifying agent to the alkyl alcohol from 2:1 to 4:1. Significantly, less acid could be microemulsified into the system when a weight ratio of emulsifying agent to alkyl alcohol of 1:1 was employed.

Next, a batch of samples employing a propoxylated branched chain alcohol ("BEROL A-2 ®") as the emulsifying agent, n-hexanol as the alkyl alcohol and isopropyl alcohol (IPA) as a co-solvent for the acid was formed. In each sample, the isopropyl alcohol was admixed with the kerosene. In a first series of tests, the weight ratio of kerosene to isopropyl alcohol was 9:1. In a second series of tests, the weight ratio of kerosene to isopropyl alcohol was 3:1. In both series of tests, the acid employed was an acid solution comprising 15% by weight hydrochloric acid. The results of the tests are shown in Tables III and IV below.

TABLE III

| | Kerosene/Isopropyl Alcohol Ratio of 9:1 | | | |
|---|---|---|---|---|
| Emulsifying Agent/Alkyl Alcohol Ratio | Emulsifying Agent/Alkyl Alcohol Amount (Wt. %) | Kerosene/IPA (Wt. %) | 15% HCl (Wt. %) | Emulsifying Agent & Alkyl Alcohol/HCl Ratio |
| 2:1 | 10.9 | 85.0 | 4.1 | 2.66 |

TABLE III-continued

Kerosene/Isopropyl Alcohol Ratio of 9:1

| Emulsifying Agent/Alkyl Alcohol Ratio | Emulsifying Agent/Alkyl Alcohol Amount (Wt. %) | Kerosene/IPA (Wt. %) | 15% HCl (Wt. %) | Emulsifying Agent & Alkyl Alcohol/HCl Ratio |
|---|---|---|---|---|
| 2:1 | 19.6 | 70.5 | 9.4 | 2.09 |
| 2:1 | 32.0 | 55.1 | 12.5 | 2.56 |
| 2:1 | 40.0 | 40.0 | 20.0 | 2.00 |
| 2:1 | 59.0 | 16.9 | 23.4 | 2.52 |

TABLE IV

Kerosene/Isopropyl Alcohol Ratio of 3:1

| Emulsifying Agent/Alkyl Alcohol Ratio | Emulsifying Agent/Alkyl Alcohol Amount (Wt. %) | Kerosene/IPA (Wt. %) | 15% HCl (Wt. %) | Emulsifying Agent & Alkyl Alcohol/HCl Ratio |
|---|---|---|---|---|
| 2:1 | 10.3 | 85.7 | 4.0 | 2.58 |
| 2:1 | 19.6 | 70.1 | 10.0 | 1.96 |
| 2:1 | 29.5 | 53.2 | 17.3 | 1.71 |
| 2:1 | 40.0 | 40.0 | 20.0 | 2.00 |
| 2:1 | 58.0 | 16.6 | 26.1 | 3.49 |

As shown by Tables III and IV, changes in the weight ratio of the kerosene to the isopropanol did not significantly affect the concentration of acid that could be microemulsified into the kerosene.

Next, a batch of samples employing a propoxylated branched chain alcohol ("BEROL A-2 ®") as the emulsifying agent and n-butanol as the alkyl alcohol were formed. The weight ratio of the emulsifying agent to the alkyl alcohol was varied from 1:1 to 3:1. The acid employed in the test was an acid solution comprising 15% by weight hydrochloric acid. The results of the tests are shown in Table V below.

TABLE V

N-Butanol as Alkyl Alcohol

| Emulsifying Agent/Alkyl Alcohol Ratio | Emulsifying Agent/Alkyl Alcohol Amount (Wt. %) | Kerosene (Wt. %) | 15% HCl (Wt. %) | Emulsifying Agent & Alkyl Alcohol/HCl Ratio |
|---|---|---|---|---|
| 1:1 | 28.0 | 60.1 | 11.7 | 2.39 |
| 2:1 | 27.5 | 58.5 | 15.4 | 1.79 |
| 3:1 | 28.0 | 60.1 | 11.7 | 2.39 |

As shown by Table V, changing the chain length of the alkyl alcohol from 6 carbon atoms to 4 carbon atoms did not significantly affect the amount of acid that could be microemulsified into the system.

Finally, a batch of samples employing an admixture of a potassium salt of a mixed amine propionate and a secondary alcohol having 15 carbon atoms and propoxylated with 9 moles of propylene oxide as the emulsifying agent and n-hexanol as the alkyl alcohol were formed. The potassium salt of the mixed amine propionate forming the emulsifying agent is sold by Ivanhoe Chemical under the trade name "I PHO T-35 ®". The secondary alcohol having 15 carbon atoms and propoxylated with 9 moles of propylene oxide forming the emulsifying agent is sold by Union Carbide Corp. under the trade name "TERGITOL 15-S-9 ®". In a first test, the acid employed was an acid solution comprising 15% by weight hydrochloric acid. In a second test, the acid employed was an acid solution comprising 28% by weight hydrochloric acid. The results of the tests are shown in Table VI below:

TABLE VI

| Acid | Amount of Acid (Wt. %) | 15% HCl/28% HCl Emulsifying Agent | | n-Hexanol (Wt. %) | Kerosene (Wt. %) |
|---|---|---|---|---|---|
| | | Agent A* (Wt. %) | Agent B** (Wt. %) | | |
| 15% HCl | 36.68 | 28.21 | 0.35 | 0.65 | 35.27 |
| 28% HCl | 21.80 | 34.25 | 4.20 | 0.60 | 33.45 |

*A potassium salt of a mixed amine propionate.
**A secondary alcohol having 15 carbon atoms and propoxylated with 9 moles of propylene oxide.

As shown by Table VI, 36.1 weight percent of a solution comprising 15% by weight hydrochloric acid and 21.8% of a solution comprising 28% by weight hydrochloric acid could be microemulsified into kerosene by employing an admixture of a potassium salt of a mixed amine propionate and a secondary alcohol having 15 carbon atoms and propoxylated with 9 moles of propylene oxide as the emulsifying agent and n-hexanol as the alkyl alcohol.

Thus, the compositions of the present invention are capable of delivering a large amount of acid in a relatively small volume of fluid into a subterranean formation.

EXAMPLE II

A series of tests were carried out to determine various properties of the acid internal microemulsion well treatment composition of the present invention and to compare the composition to other acid internal microemulsion well treatment compositions.

Two samples of the inventive composition were tested, inventive microemulsion A and inventive microemulsion B. The emulsifying agent employed in inventive microemulsion A consisted of an admixture of a potassium salt of a mixed amine propionate (sold by Ivanhoe Chemical under the trade name "I PHO T-35 ®") and an emulsifier comprising an alcohol having 15 carbon atoms and propoxylated with 9 moles of propylene oxide (sold by Union Carbide Corp. under the trade name "TERGITOL 15-S-9 ®"). The emulsifying agent employed in microemulsion B consisted of an admixture of a nonylphenoxy polyethoxy ethanol (sold by Rohm & Haas under the trade name "TRITON N-42 ®") and a secondary alcohol having 15 carbon atoms and propoxylated with 9 moles of propylene oxide ("TERGITOL 15-S-9 ®").

Inventive microemulsion A consisted of 31.3% by weight kerosene, 35.0% by weight of the potassium salt of the mixed amine propionate, 6.1% by weight of the secondary alcohol having 15 carbon atoms and propoxylated with 9 moles of propylene oxide, 6.7% by weight n-hexanol and 20.9% by weight of a solution comprising 20% by weight hydrochloric acid. Inventive microemulsion B consisted of 31.3% by weight kerosene, 35.0% by weight of the nonylphenoxy polyethoxy ethanol, 6.1% by weight of the secondary alcohol having 15 carbon atoms and propoxylated with 9 moles of propylene oxide, 6.7% by weight n-hexanol and 20.9% by weight of a solution comprising 20% by weight hydrochloric acid.

Two other microemulsions were tested, comparative microemulsion A and comparative microemulsion B. Comparative microemulsion A consisted of 42% by weight VM&P (Varnish Makers & Painters) naphtha, 18.0% by weight nonylphenoxy polyethoxy ethanol ("TRITON N-42 ®") and 40.0% by weight of a solution comprising 20.0% by weight hydrochloric acid. Comparative microemulsion B consisted of 42.0% by weight VM&P naphtha, 15.3% by weight nonylphenoxy polyethoxy ethanol ("TRITON N-42 ®"), 2.7% by weight octylphenoxy polyethoxy ethanol (sold by Rohm & Haas under the trade name "TRITON X-35 ®") and 40.0% by weight of an aqueous acid solution comprising 20% by weight hydrochloric acid.

First, the specific gravities of the microemulsions were determined. The results of these tests are shown in Table VII below.

TABLE VII

| Specific Gravities | |
|---|---|
| Composition | Specific Gravity |
| Inventive Microemulsion A | 0.932 |
| Inventive Microemulsion B | 0.932 |
| Comparative Microemulsion A | 0.926 |
| Comparative Microemulsion B | 0.926 |

Next, the temperature stabilities of the microemulsions were determined. The compositions were heated or cooled until they became cloudy. The temperature range within which the compositions were not cloudy was recorded. The results of the tests are shown in Table VIII below.

TABLE VIII

| Temperature Stability | |
|---|---|
| Composition | Stability Range (°F.) |
| Inventive Microemulsion A | Less than 0–160 |
| Inventive Microemulsion B | Less than 1–160 |
| Comparative Microemulsion A | 75–90 |

TABLE VIII-continued

| Temperature Stability | |
|---|---|
| Composition | Stability Range (°F.) |
| Comparative Microemulsion B | —* |

*The microemulsion separated upon the application of heat.

Next, the compatibilities of the microemulsions with water were determined. These tests were carried out by admixing the microemulsions with tap water and observing the resulting admixtures to see if solids settled out. The results of the tests are shown in Table IX below.

TABLE IX

| Compatibility with Water | |
|---|---|
| Composition | Effect of Dilution With Water |
| Inventive Microemulsion A | Blended to form opalescent fluid |
| Inventive Microemulsion B | 2 phase, neither viscous and no solids |
| Comparative Microemulsion A | Sticky solids settled out |
| Comparative Microemulsion B | Sticky solids settled out |

Next, the compatibilities of the microemulsions with dissolved iron and the abilities of the microemulsions to sequester iron when spent on calcium carbonate ($CaCO_3$) were determined. The compatibilities of the microemulsions with dissolved iron were determined by admixing each microemulsion with the required amount of a standardized $FeCl_3$ solution (200,000 mg/L Fe(III)) to achieve the desired ferric iron concentration therein and observing the effect thereof. The abilities of the microemulsions to sequester iron when spent on calcium carbonate ($CaCo_3$) were determined by admixing the iron containing microemulsions with calcium carbonate, allowing the acid to spend and observing the spent compositions to see if solids settled out. The results of the tests are shown in Table X below.

TABLE X

| Compatibility of Compositions with Dissolved Iron | | |
|---|---|---|
| Composition | Compatibility with Iron (mg/L Fe(III))* | Sequestration of Iron** |
| Inventive Microemulsion A | 10,000 | yes |
| Inventive Microemulsion B | 10,000 | no |
| Comparative Microemulsion A | 5,000 | no |
| Comparative Microemulsion B | 5,000 | no |

*Amount of Fe(III) added without breaking emulsion.
**Whether iron was sequestered when the microemulsion was spent on calcium carbonate ($CaCO_3$).

Next, the percent of hydrochloric acid contained in each microemulsion was determined. These tests were carried out by titrating each microemulsion with a 0.2 N sodium hydroxide solution to a phenolphthalein end point. The results of the tests are shown in Table XI below.

TABLE XI

| Amount of Acid Microemulsified | |
|---|---|
| Composition | % HCl |
| Inventive Microemulsion A | 4.9 |
| Inventive Microemulsion B | 4.9 |
| Comparative Microemulsion A | 9.5 |
| Comparative Microemulsion B | 9.5 |

Next, the corrosion properties of inventive microemulsion A and comparative microemulsion A at various temperatures with and without a corrosion inhibitor present were determined. The tests were carried out by placing a preweighed steel coupon in each microemulsion for approximately six hours and re-weighing the coupon to determine weight loss due to corrosion by the acid. The corrosion inhibitor employed in the tests was an acetylenic alcohol corrosion inhibitor sold by Halliburton Services of Duncan, Oklahoma under the trade name "HAI-65 ®". The amount of the corrosion inhibitor employed was 0.1% by weight of the composition being tested. The results of the tests are shown in Table XII below.

TABLE XII

| Temperature (°F.) | Corrosion Properties (lbs./ft.$^2$)* | | | |
|---|---|---|---|---|
| | Inventive Microemulsion A | | Comparative Microemulsion A*** | |
| | With Corrosion Inhibitor** | Without Corrosion Inhibitor | With Corrosion Inhibitor** | Without Corrosion Inhibitor |
| 100 | 0.003 | 0.005 | 0.012 | 0.021 |
| 125 | 0.003 | 0.018 | 0.006 | 0.010 |
| 140 | 0.006 | 0.032 | 0.020 | 0.035 |

*The corrosion properties are expressed in terms of the number of pounds per square foot of a steel coupon lost after exposure to the microemulsion being tested.
**The microemulsion contained 0.1% by weight of an acetylenic alcohol corrosion inhibitor sold by Halliburton Services of Duncan, Oklahoma under the trade name "HAI-65 ®".
***In each test, the microemulsion separated when heated and thick sticky solids settled out which partially covered the coupon. The amount of the solids that settled out increased with temperature.

Next, the viscosities of the microemulsions were determined. The viscosities were measured with a Model 35 Fann Viscometer at 300 rpm. The results of the tests are shown in Table XIII below.

TABLE XIII

| Composition | Viscosity Apparent Viscosity* (cp) |
|---|---|
| Inventive Microemulsion A | 76** |
| Inventive Microemulsion B | 63 |
| Comparative Microemulsion A | 65 |
| Comparative Microemulsion B | 65 |

*The viscosity was measured approximately two months after the microemulsion was formed.
**The initial viscosity of this microemulsion was 31 cp. After 18 hours, the viscosity was 48 cp. After 48 hours, the viscosity was 48 cp.

Next, the abilities of the microemulsions to water wet and oil wet sandstone and limestone were determined. The tests were carried out in accordance with the test procedure set forth in American Petroleum Institute RP-42, 2nd Edition, January, 1977. The results of the tests are shown in Table XIV below.

TABLE XIV

| Composition | Wetting Properties | |
|---|---|---|
| | Sandstone | Limestone |
| Inventive Microemulsion A | Water wet | Oil wet |
| Inventive Microemulsion B | Oil wet | Water wet |
| Comparative Microemulsion A | Oil wet | Water wet |
| Comparative Microemulsion B | Oil wet | Water wet |

As shown by Table VII, the specific gravity of each inventive microemulsion was 0.932. The specific gravity of each comparative microemulsion was 0.926.

As shown by Table VIII, the inventive microemulsions were stable from less than 0° to approximately 160°. Comparative microemulsion A separated below 75° F. and above 90° F., while comparative microemulsion B separated immediately upon being heated or cooled.

As shown by Table IX, the inventive microemulsions were compatible with dilution water. Upon dilution with water, sticky solids settled out of the comparative microemulsions presenting a clean-up problem. Although the solids could not be removed with water, they could be thinned and dispersed with oil.

As shown by Table X, the inventive microemulsions were compatible with 10,000 mg/L Fe(III). Inventive microemulsion A sequestered 5,000 mg/L Fe(III) when spent on $CaCO_3$, while inventive microemulsion B did not sequester any iron. Although the comparative microemulsions were compatible with 5,000 mg/L Fe(III), they did not sequester any iron.

Table XI shows that inventive microemulsions A and B contained 4.9% by weight hydrochloric acid while comparative microemulsions A and B contained 9.5% by weight hydrochloric acid. Table XII shows that both inventive microemulsion A and comparative microemulsion A had acceptable corrosion properties at temperatures up to 140° F. for six hours, both with and without a corrosion inhibitor present.

Table XIII shows that inventive microemulsion A and inventive microemulsion B had viscosities of 76 and 63, respectively, while the comparative microemulsions each had a viscosity of 65. As shown by Table XIV, inventive microemulsion A water wet sandstone and oil wet limestone while inventive microemulsion B oil wet sandstone and water wet limestone. Comparative microemulsions A and B both oil wet sandstone and water wet limestone.

Thus, the inventive acid internal microemulsion well treatment composition provides an improved "retarded" acidizing system. The microemulsion is thermodynamically stable, compatible with dilution water and iron and does not present corrosion problems.

The preceding examples can be repeated with similar success by substituting the generically or specifically described reactants and/or operating conditions of this invention for those used in the examples.

Although certain preferred embodiments of the invention have been described for illustrative purposes, it will be appreciated that various modifications and innovations of the compositions and method recited herein may be effected without departure from the basic principals which underlie the invention. Changes of this type are therefore deemed to lie within the spirit and scope of the invention except as may be necessarily limited by the inventive claims and reasonable equivalents thereof.

What is claimed is:

1. A concentrate which forms an acid internal microemulsion well treatment composition when added to an acid treatment fluid, comprising:
    (a) in the range of from about 20% to about 98% by weight of a hydrocarbon carrier fluid;

(b) in the range of from about 1% to about 50% by weight of an alkyl alcohol having in the range of from 4 to 18 carbon atoms; and (c) int he range of from about 1% to about 50% by weight of an emulsifying agent comprising at least one compound selected from the group consisting of amine salts having ester or amide linkages and propoxylated alcohols, each of said components (a)-(c) being different compounds or different mixtures of compounds.

2. The concentrate of claim 1 wherein said hydrocarbon carrier fluid is selected from the group consisting of kerosene, diesel oil, xylene and mixtures of technical grade aromatic solvents.

3. The concentrate of claim 1 wherein said alkyl alcohol has in the range of from 4 to 12 carbon atoms.

4. The concentrate of claim 1 wherein said emulsifying agent is selected from the group consisting of propoxylated alcohols and oleophilic betaines.

5. The concentrate of claim 1 wherein said concentrate comprises in the range of from about 20% to about 40% by weight of said hydrocarbon carrier fluid, in the range of from about 1% to about 20% by weight of said alkyl alcohol and in the range of from about 1% to about 40% by weight of said emulsifying agent.

6. The concentrate of claim 1 further comprising:
(d) in the range of from about 1% to about 20% by weight of a co-solvent for the acid treatment fluid, said co-solvent for said acid treatment fluid being a primary alcohol, and each of said components (a)-(d) being different compounds or different mixtures of compounds.

7. The concentrate of claim 1 further comprising:
(d) in the rang of from about 1% to about 20% by weight of a co-surfactant for said alkyl alcohol, said cosurfactant for said alkyl alcohol being selected for the group consisting of glycol ethers, ethoxylated alcohols and propoxylated alcohols, and each of said components (a)-(d) being different compounds or different mixtures of compounds.

8. An acid internal microemulsion well treatment composition comprising:
(a) in the range of from about 20% to about 97% by weight of a hydrocarbon carrier fluid, said hydrocarbon carrier fluid forming the external phase of the well treatment composition;
(b) in the range of from about 1% to about 50% by weight of an alkyl alcohol having in the range of from 4 to 18 carbon atoms for reducing the interfacial tension of the well treatment composition and facilitating formation of the acid into micro size spherical droplets;
(c) in the range of from about 1% to about 50% by weight of an emulsifying agent for forming and maintaining a stable acid internal microemulsion, said emulsifying agent comprising at least one compound selected from the group consisting of amine salts having ester or amide linkages and propoxylated alcohols; and
(d) in the range of from about 1% to about 50% by weight of an acid treatment fluid microemulsified into said hydrocarbon carrier fluid, each of said components (a)-(d) being different compounds or different mixtures of compounds.

9. The well treatment composition of claim 8 wherein said hydrocarbon carrier fluid is selected from the group consisting of kerosene, diesel oil, xylene and mixtures of technical grade aromatic solvents.

10. The well treatment composition of claim 8 wherein said acid treatment fluid is an aqueous hydrochloric acid solution comprising in the range of from about 1% to about 38% by weight hydrochloric acid.

11. The well treatment composition of claim 8 wherein said alkyl alcohol has in the range of from 4 to 12 carbon atoms.

12. The well treatment composition of claim 8 wherein said emulsifying agent is selected from the group consisting of propoxylated alcohols and oleophilic betaines.

13. The well treatment composition of claim 8 wherein said composition comprises in the range of from about 25% to about 60% by weight of said hydrocarbon carrier fluid, in the range of from about 1% to about 10% by weight of said alkyl alcohol, in the range of from about 10% to about 40% by weight of said emulsifying agent, and in the range of from about 1% to about 40% by weight of said acid treatment fluid.

14. The well treatment composition of claim 8 further comprising:
(e) in the range of from about 1% to about 20% by weight of a co-solvent for said acid treatment fluid, said co-solvent for said acid treatment fluid being a primary alcohol, and each of said components (a)-(e) being different compounds or different mixtures of compounds.

15. The well treatment composition of claim 8 further comprising:
(e) in the range of from about 1% to about 20% by weight of a co-surfactant for said alkyl alcohol, said co-surfactant for said alkyl alcohol being selected from the group consisting of glycol ethers, ethoxylated alcohols and propoxylated alcohols, and each of said components (a)-(e) being different compounds or different mixtures of compounds.

16. A method of treating a subterranean formation to increase the production of hydrocarbons therefrom comprising contacting said formation with an acid internal microemulsion well treatment composition comprising:
(a) in the range of from about 20% to about 97% by weight of a hydrocarbon carrier fluid, said hydrocarbon carrier fluid forming the external phase of the well treatment composition;
(b) in the range of from about 1% to about 50% by weight of an alkyl alcohol having in the range of from 4 to 18 carbon atoms for reducing the interfacial tension of the well treatment composition and facilitating formation of the acid into micro size spherical droplets;
(c) in the range of from about 1% to about 50% by weight of an emulsifying agent for forming and maintaining a stable acid internal microemulsion, said emulsifying agent comprising at least one compound selected from the group consisting of amine salts having ester or amide linkages and propoxylated alcohols; and
(d) in the range of from about 1% to about 50% by weight of an acid treatment fluid microemulsified into said hydrocarbon carrier fluid, each of said components (a)-(d) being different compounds or different mixtures of compounds.

17. The method of claim 16 wherein said hydrocarbon carrier fluid is selected from the group consisting of kerosene, diesel oil, xylene and mixtures of technical grade aromatic solvents.

18. The method of claim 16 wherein said acid treatment fluid is an aqueous hydrochloric acid solution comprising in the range of from about 1% to about 38% by weight hydrochloric acid.

19. The method of claim 16 wherein said well treatment composition further comprises:
(e) in the range of from about 1% to about 20% by weight of a co-solvent for said acid treatment fluid, said co-solvent for said acid treatment fluid being a primary alcohol, and each of said components (a)-(e) being different compounds or different mixtures of compounds.

20. The method of claim 16 wherein said well treatment composition further comprises:
(e) in the range of from about 1% to about 20% by weigh of a co-surfactant for said alkyl alcohol, said co-surfactant for said alkyl alcohol being selected from the group consisting of glycol ethers, ethoxylated alcohols and propoxylated alcohols, and each of said components (a)-(e) being different compounds or different mixtures of compounds.

21. A concentrate which forms an acid internal microemulsion well treatment composition when added to an acid treatment fluid, comprising:
(a) in the range of from about 20% to about 40% by weight of a hydrocarbon carrier fluid selected from the group consisting of kerosene, diesel oil, xylene and mixtures of technical grade aromatic solvents, said hydrocarbon carrier fluid forming the external phase of the well treatment composition then the concentrate is added to an acid treatment fluid;
(b) in the range of from about 1% to about 20% by weight of an alkyl alcohol having in the range of from 4 to 12 carbon atoms, said alkyl alcohol reducing the interfacial tension of the well treatment composition and facilitating formation of the acid into micro size spherical droplets when the concentrate is added to an acid treatment fluid; and
(c) in the range of from about 1% to about 40% by weight of an emulsifying agent comprising at least one compound selected from the group consisting of amine salts having ester linkages and propoxylated alcohols, said emulsifying agent forming and maintaining a stable acid internal microemulsion when the concentrate is added to an acid treatment fluid and each of said components (a)-(c) being different compounds or different mixtures of compounds.

22. The concentrate of claim 21 wherein said hydrocarbon carrier fluid is kerosene.

23. The concentrate of claim 21 wherein said alkyl alcohol has in the range of from 4 to 8 carbon atoms.

24. The concentrate of claim 21 wherein said concentrate comprises in the range of from about 1% to about 10% by weight of said alkyl alcohol.

25. The concentrate of claim 21 wherein said emulsifying agent is a propoxylated alcohol.

26. THe concentrate of claim 21 wherein said concentrate comprises in the range of from about 20% to about 40% by weight of said emulsifying agent.

27. The concentrate of claim 21 wherein said emulsifying agent comprises at least one compound selected from the group consisting of propoxylated branched chain alcohols and potassium salts of mixed amine propionates.

28. The concentrate of claim 21 further comprising:
(d) in the range of from about 5% to about 20% by weight of a co-solvent for the acid treatment fluid, said co-solvent being a primary alcohol, and each of said components (a)-(d) being different compounds or different mixtures of compounds.

29. The concentrate of claim 28 wherein said co-solvent is isopropanol.

30. The concentrate of claim 21 further comprising:
(d) in the range of from about 5% to about 20% by weight of a co-surfactant for said alkyl alcohol, said co-surfactant being selected from the group consisting of glycol ethers and ethoxylated alcohols, and each of said components (a)-(d) being different compounds or different mixtures of compounds.

31. The concentrate of claim 30 wherein said co-surfactant is ethylene glycol monobutyl ether.

32. An acid internal microemulsion well treatment composition comprising:
(a) in the range of from about 25% to about 60% by weight of a hydrocarbon carrier fluid selected from the group consisting of kerosene, diesel oil, xylene and mixtures of technical grade aromatic solvents, said hydrocarbon carrier fluid forming the external phase of the well treatment composition;
(b) in the range of from about 1% to about 10% by weigh of an alkyl alcohol having in the range of from 4 to 12 carbon atoms, said alkyl alcohol reducing the interfacial tension of the well treatment composition and facilitating formation of the acid into micro size spherical droplets;
(c) in the range of from about 10% to about 40% by weight of an emulsifying agent for forming and maintaining a stable acid internal microemulsion, said emulsifying agent comprising at least one compound selected from the group consisting of amine salts having ester linkages and propoxylated alcohols; and
(d) in the range of from about 1% to about 40% by weight of an aqueous acid solution including at least one acid selected from the group consisting of hydrochloric acid, acetic acid, citric acid, erythorbic acid, formic acid and hydrofluoric acid, said aqueous acid solution being microemulsified into said hydrocarbon carrier fluid, and each of said components (a)-(d) being different compounds or different mixtures of compounds.

33. The composition of claim 32 wherein said emulsifying agent is a propoxylated alcohol.

34. The composition of claim 32 wherein said emulsifying agent comprises at least one compound selected from the group consisting of propoxylated branched chain alcohols and potassium salts of mixed amine propionates.

35. The composition of claim 32 further comprising:
(e) in the range of from about 5% to about 20% by weight of a co-solvent for said aqueous acid solution, said cosolvent being a primary alcohol, an each of said components (a)-(e) being different compounds or different mixtures of compounds.

36. The composition of claim 35 wherein said co-solvent is isopropyl alcohol.

37. The composition of claim 32 further comprising:
(e) in the rang of from about 5% to about 20% by weight of a co-surfactant for said alkyl alcohol, said co-surfactant being selected from the group consisting of glycol ethers and ethoxylated alcohols, and each of said components (a)-(e) being different compounds or different mixtures of compounds.

38. THe composition of claim 37 wherein said co-surfactant is ethylene glycol monobutyl ether.

* * * * *